(12) United States Patent
Park et al.

(10) Patent No.: US 10,173,682 B2
(45) Date of Patent: Jan. 8, 2019

(54) P-RANGE ENGAGEMENT METHOD OF VEHICLE AND CONTROL DEVICE THEREOF

(71) Applicants: Hyundai Motor Company, Seoul (KR); Kia Motors Corporation, Seoul (KR)

(72) Inventors: Han Gil Park, Suwon-si (KR); Chang Hyun Lee, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 117 days.

(21) Appl. No.: 15/374,023

(22) Filed: Dec. 9, 2016

(65) Prior Publication Data

US 2018/0009439 A1 Jan. 11, 2018

(30) Foreign Application Priority Data

Jul. 11, 2016 (KR) .................. 10-2016-0087472

(51) Int. Cl.
*B60W 10/10* (2012.01)
*B60W 30/18* (2012.01)
(Continued)

(52) U.S. Cl.
CPC ...... *B60W 30/18054* (2013.01); *B60W 10/10* (2013.01); *B60W 10/182* (2013.01);
(Continued)

(58) Field of Classification Search
None
See application file for complete search history.

(56) References Cited

U.S. PATENT DOCUMENTS 7,681,961 B2 * 3/2010 Nonaga ............... B60T 13/746
188/162
8,282,530 B2 * 10/2012 Yamamoto ............ B60T 7/085
477/71

(Continued)

FOREIGN PATENT DOCUMENTS

JP 2011-122670 A 6/2011
JP 2015-030293 A 2/2015
(Continued)

*Primary Examiner* — Dirk Wright
(74) *Attorney, Agent, or Firm* — Morgan, Lewis & Bockius LLP

(57) ABSTRACT

A P-range engagement method of the vehicle and a device thereof are disclosed. The P-range engagement method is applied to the vehicle equipped with an electronic shift lever, and the method includes performing the vehicle stopping process based on detection of stopping of a traveling vehicle through a control device, holding wheel disks of the vehicle through a controller that is controlled by the control device, comparing the vehicle stopped time period, which is measured by the control device, with a predetermined reference value stored in the control device to determine whether the vehicle stopped time period exceeds the predetermined reference value, and upon determining that the vehicle stopped time period exceeds the predetermined reference value, determining whether conditions for performing P-range engagement are satisfied, and upon determining that the conditions for performing the P-range engagement are satisfied, completing the P-range engagement.

11 Claims, 2 Drawing Sheets

(51) Int. Cl.
*B60W 10/188* (2012.01)
*B60W 50/14* (2012.01)
*B60W 10/18* (2012.01)
*F16H 59/44* (2006.01)

(52) U.S. Cl.
CPC .......... *B60W 10/188* (2013.01); *B60W 50/14* (2013.01); *B60W 2050/143* (2013.01); *B60W 2520/04* (2013.01); *B60W 2710/182* (2013.01); *F16H 2059/446* (2013.01)

(56) References Cited

U.S. PATENT DOCUMENTS

| | | | |
|---|---|---|---|
| 8,868,305 B2* | 10/2014 | Jang | F16H 61/0059 701/1 |
| 8,918,261 B2* | 12/2014 | Busack | B60T 7/085 188/158 |
| 9,371,909 B2* | 6/2016 | MacFarlane | F16H 59/44 |
| 2006/0186731 A1* | 8/2006 | Bach | B60T 7/104 303/89 |
| 2010/0252378 A1* | 10/2010 | Hilberer | B60T 7/107 188/106 F |

FOREIGN PATENT DOCUMENTS

| | | |
|---|---|---|
| JP | 2015-086936 A | 5/2015 |
| KR | 10-0828946 B1 | 5/2008 |
| KR | 10-2011-0134110 A | 12/2011 |
| KR | 10-2013-0066388 A | 6/2013 |
| KR | 10-1601770 B1 | 3/2016 |
| KR | 10-2016-0042565 A | 4/2016 |

* cited by examiner

P-RANGE ENGAGEMENT METHOD OF VEHICLE AND CONTROL DEVICE THEREOF

CROSS-REFERENCE TO RELATED APPLICATION

The present application claims priority to Korean Patent Application No. 10-2016-0087472, filed on Jul. 11, 2016, the entire contents of which is incorporated herein for all purposes by this reference.

BACKGROUND OF THE INVENTION

Field of the Invention

The present invention relates to a vehicle equipped with an electronic stability control (ESC) system and an electronic shift lever (shift by wire, SBW), and more particularly, to a P-range engagement method of a vehicle and a control device thereof, which is capable of achieving the function of an electronic parking brake (EPB) in a vehicle that is not equipped with an EPB.

Description of Related Art

Recently, vehicles equipped with an ESC system and an EPB in order to secure passengers' safety have been increasingly developed and released in the market.

The ESC system functions to control the orientation of the vehicle body on behalf of a driver in an emergency. While the representative active safety device for vehicles in the $20^{th}$ century was an anti-lock brake system (ABS), the representative safety device for vehicles in the $21^{st}$ century may be an ESC system.

An ABS functions to prevent wheels from locking, and a traction control system (TCS) functions to sense wheel spin and to decrease the output of an engine in response thereto. The aforementioned ESC system performs the combined function of the ABS and the TCS, as well as other additional functions.

Respective sensors of the ESC system continually monitor the orientation of the vehicle and the driver's steering operation, that is, a steering angle. If the direction in which the vehicle is traveling becomes misaligned from the steering angle, the ESC system regards this as a dangerous situation, and immediately supplies individual braking force to the respective wheels, thereby controlling the orientation of the vehicle. In other words, the ESC system is an active safety device for vehicles, which rectifies a driver's mistake.

The ESC system stabilizes the movement of the vehicle body when the vehicle deviates from the traveling course by applying individual braking force to the four respective wheels. The ESC system includes a hydraulic modulator, a control device, and a variety of sensors. The sensors detect a steering angle and a wheel speed and transmit the detected information to the control device, and the hydraulic modulator increases the braking pressure in respective brakes. The ESC system not only applies braking force to the respective wheels, but also decreases the output of an engine.

An EPB is a parking brake system that is controlled in an electronic manner, which differs from a conventional wire-type system. While the vehicle is stopping, a computer checks a vehicle speed, an engine rpm, and whether the brake is in an operational or non-operational state, and the parking brake is locked depending on the degree to which the driver steps on the brake pedal.

Therefore, even when the driver takes his or her foot off the brake pedal in the stopped state, there is little possibility of the locking state of the parking brake being released. If the driver steps on an accelerator pedal, the locking state of the parking brake is automatically released, and accordingly the driver can move the vehicle. Further, the EPB has advantages of preventing the vehicle from moving downward when the driver starts to drive on an uphill road from the stopped state and of preventing the driver from needing to frequently step on the accelerator pedal when driving in a congested area. While traveling, since the computer determines that the vehicle is moving by detecting the vehicle speed, the EPB is never operated.

However, if the electronic stability control system, the electronic parking brake and the electronic shift lever are all mounted together to the vehicle, the structure becomes complicated and the manufacturing cost is increased.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a P-range engagement method of the vehicle and a device thereof, which is configured for achieving the function of an electronic parking brake (EPB) using an electronic stability control (ESC) system and an electronic shift lever in the vehicle that is not equipped with an EPB.

In accordance with an aspect of the present invention, the above and other objects can be accomplished by the provision of a P-range engagement method of the vehicle equipped with an electronic shift lever, the method including performing the vehicle stopping process based on detection of stopping of a traveling vehicle, the detection being performed by a control device, holding wheel disks of the vehicle through a controller when the vehicle stopping process is completed, the controller being controlled by the control device, comparing the vehicle stopped time period with a predetermined reference value stored in the control device, the vehicle stopped time period being measured by the control device, to determine whether the vehicle stopped time period exceeds the predetermined reference value, and upon determining that the vehicle stopped time period exceeds the predetermined reference value stored in the control device, determining whether conditions for performing P-range engagement are satisfied, and upon determining that the conditions for performing the P-range engagement are satisfied, completing the P-range engagement.

The holding may include holding the wheel disks by controlling a hydraulic pressure through the controller that is controlled by the control device.

In the comparing, the reference value used in operation of smart cruise control may be set to be larger than the reference value used in operation of an electronic stability control system.

The comparing may include determining whether it is impossible to control a hydraulic pressure of the electronic stability control system through the control device.

The method may further include determining whether a P-range engagement request signal is input to the control device through the control device.

The method may further include, upon determining that the P-range engagement request signal is input to the control device, determining whether a state of the vehicle satisfies conditions for performing the P-range engagement through the control device.

Upon determining that the state of the vehicle satisfies the conditions for performing the P-range engagement, the control device may perform the completing the P-range engagement.

The method may further include, upon determining that the state of the vehicle does not satisfy the conditions for performing the P-range engagement, warning a driver through the control device that the P-range engagement is incapable of being achieved even in a situation necessarily requiring the P-range engagement.

Upon determining that the P-range engagement request signal is not input to the control device, the control device may perform the comparing repeatedly.

Upon determining that the vehicle stopped time period is less than the predetermined reference value stored in the control device, the control device may measure the vehicle stopped time period repeatedly.

The method may further include, after the completing the P-range engagement, releasing the holding the wheel disks through the controller that is controlled by the control device.

In accordance with another aspect of the present invention, there is provided a control system for implementing the P-range engagement method of a P-range engagement device of the vehicle, which includes an electronic shift lever for performing gear shift of a transmission, a control portion configured to receive information related to a state of the vehicle, the information being detected by a detecting device provided at a plurality of locations on the traveling vehicle, an electronic stability control system for controlling an orientation of the vehicle body based on the information received by the control portion, and wheels configured to be held or released by the controller that is controlled by the control portion.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
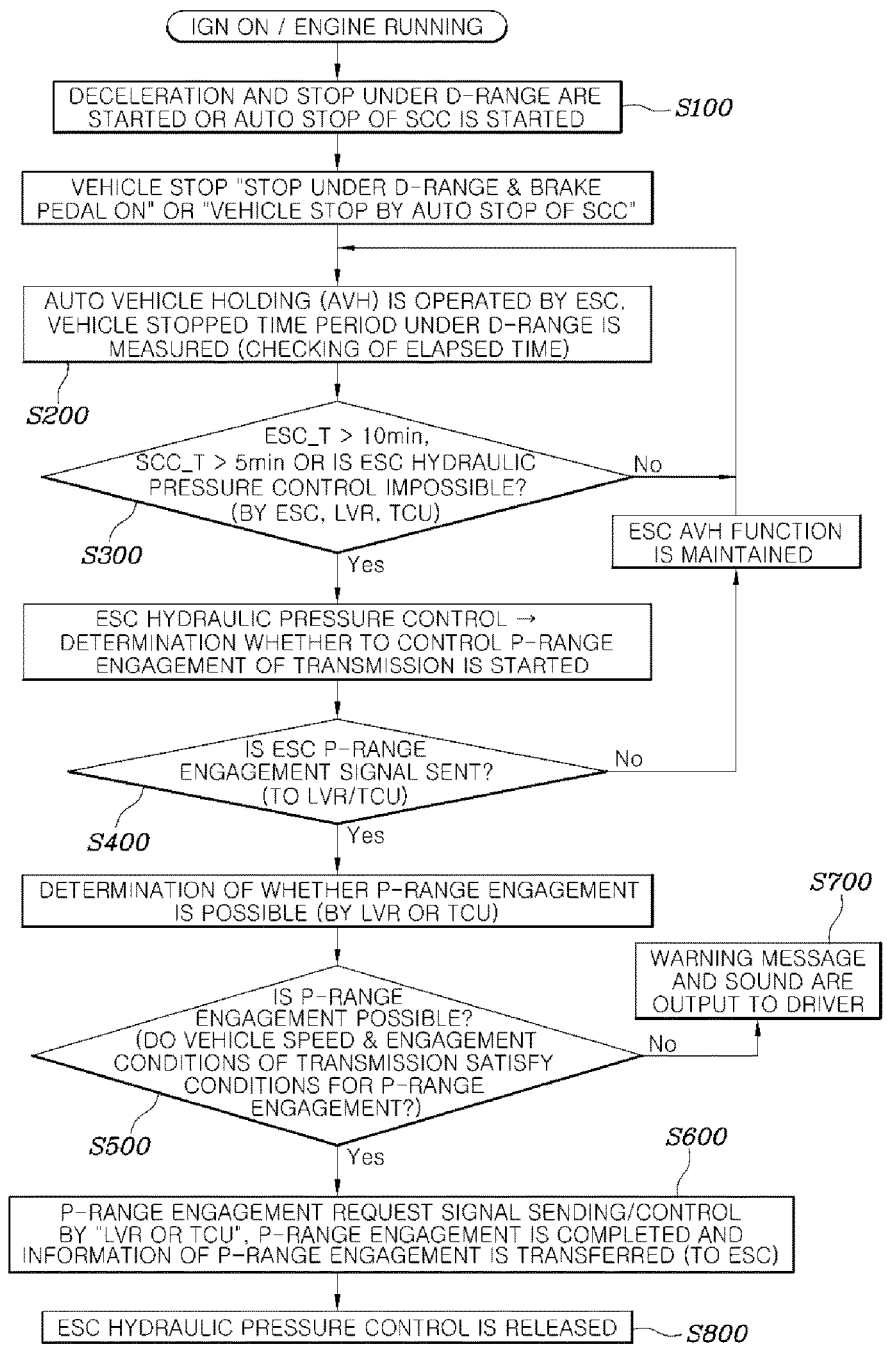
FIG. 1 is a flowchart illustrating a P-range engagement method of the vehicle according to an embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Reference will now be made in detail to exemplary embodiments of the present invention, examples of which are illustrated in the accompanying drawings. Wherever possible, the same reference numbers will be used throughout the drawings to refer to the same or like parts.

FIG. 1 is a flowchart illustrating a P-range engagement method of the vehicle according to an embodiment of the present invention. Referring to FIG. 1, a P-range engagement method according to an exemplary embodiment of the present invention is applied to the vehicle that is equipped with an electronic shift lever, and the method includes a stopping step (S100), in which a control device 200 detects that a traveling vehicle starts to be stopped and the vehicle stopping process is performed, a holding step (S200), in which, upon determining that the stopping process may have been completed in the stopping step (S100), the control device 200 holds wheel disks 700 of the vehicle through a controller 600, a comparing step (S300), in which the control device 200 measures a time period during which the vehicle is maintained in the stopped state and compares the vehicle stopped time period with a predetermined reference value stored in the control device 200 to determine whether the vehicle stopped time period exceeds the reference value, and a completion step (S600), in which, upon determining that the vehicle stopped time period exceeds the predetermined reference value stored in the control device 200 in the comparing step (S300), the control device 200 determines whether the conditions for performing the P-range engagement are satisfied, and upon determining that the conditions for performing the P-range engagement are satisfied, the control device 200 performs the P-range engagement.

When an ignition switch is turned on and the engine is started, the control device 200 continually checks the state of the vehicle through detecting device (e.g., sensors) provided at a variety of locations on the vehicle. While the vehicle is traveling, the shift range of the transmission 500 is in the D-range. When the vehicle starts to be stopped in the state in which the shift range of the transmission 500 is in the D-range, the control device 200 receives a signal indicating that the stopping of the vehicle is started, and the stopping step (S100) is performed. Also, when the driver uses a smart cruise control (SCC), the stopping process, which is performed in consideration of a distance from a foregoing vehicle or in response to stopping of the foregoing vehicle, is sensed, and the detecting signal is transmitted to the control device 200, thereby performing the stopping step (S100).

When the stopping process has been completed in the stopping step (S100), the control device 200 performs the holding step (S200) of holding the wheel disks 700 of the vehicle through the controller 600. In the holding step (S200), the shift range of the transmission 500 is still in the D-range. Therefore, the control device 200 holds the wheel disks 700 using a hydraulic pressure through the controller 600, thereby preventing the vehicle from moving. In general, the holding step (S200) is controlled by the controller 200 of an electronic stability control (ESC) system 400.

When the above-described holding step (S200) is started, the control device 200 measures a time period during which the vehicle is maintained in the stopped state. The control device 200 performs the comparing step (S300) of comparing the vehicle stopped time period with a predetermined reference value stored in the control device 200 to determine whether the vehicle stopped time period exceeds the reference value.

In the comparing step (S300), the reference value that is used in the state in which smart cruise control (SCC) is active may be set to be larger than the reference value that is used in the state in which the ESC system 400 is operating. In one example, in the comparing step (S300), when the holding step (S200) is performed by the ESC system 400, the control device 200 may determine whether the vehicle stopped time period exceeds the reference value of 10 minutes, and when the holding step (S200) is performed while the SCC is performed, the control device 200 may determine whether the vehicle stopped time period exceeds the reference value of 5 minutes. Of course, the reference value may be diversely changed depending on the vehicle model, the traveling environment, or the design specifications of the vehicle, and is not limited to the aforementioned time.

Further, in the comparing step (S300), the control device 200 determines whether it is impossible to control the hydraulic pressure of the ESC system 400. Even when it is impossible to control the hydraulic pressure of the ESC system 400, the control device 200 performs the completion step (S600). The ESC system 400, the electronic shift lever (LVR) 300, and the control device 200 of the transmission 500 are involved in the comparing step (S300).

In the comparing step (S300), upon determining that the vehicle stopped time period is less than the predetermined reference value stored in the control device 200, the control device 200 repeatedly measures the vehicle stopped time period.

In the comparing step (S300), upon determining that the vehicle stopped time period exceeds the predetermined reference value stored in the control device 200, the control device 200 determines whether the conditions for performing P-range engagement are satisfied. At this time, the control device 200 may further perform a signal checking step (S400) of determining whether a P-range engagement request signal is input to the control device 200.

Upon determining that no P-range engagement request signal is input to the control device 200 in the signal checking step (S400), the control device 200 repeatedly performs the comparing step (S300).

Conversely, in the signal checking step (S400), upon determining that the P-range engagement request signal is input to the control device 200, the control device 200 performs the vehicle state checking step (S500) of determining whether the state of the vehicle satisfies the conditions for performing the P-range engagement. The control device 200 may determine whether the state of the vehicle satisfies the conditions for performing the P-range engagement by checking the vehicle speed or by checking the engagement conditions of the transmission 500.

In the vehicle state checking step (S500), upon determining that the state of the vehicle satisfies the conditions for performing the P-range engagement, the control device 200 performs the completion step (S600) of completing the P-range engagement. At this time, after the request signal sending and the control with respect to the P-range engagement are performed by the electronic shift lever 300 and the TCU, the P-range engagement is completed. Information about this situation, related to the P-range engagement, is transferred to the ESC system 400.

When the P-range engagement is completed in the completion step (S600), the control device 200 performs a holding release step (S800) of releasing the holding of the wheel disks 700 by controlling the controller 600, and terminates the control process.

However, in the vehicle state checking step (S500), upon determining that the state of the vehicle does not satisfy the conditions for performing the P-range engagement, the control device 200 performs a warning step (S700) of warning the driver that P-range engagement is incapable of being achieved even in the situation in which the P-range engagement must be performed, thereby informing the driver of the malfunctioning of the vehicle.

Figure 2:
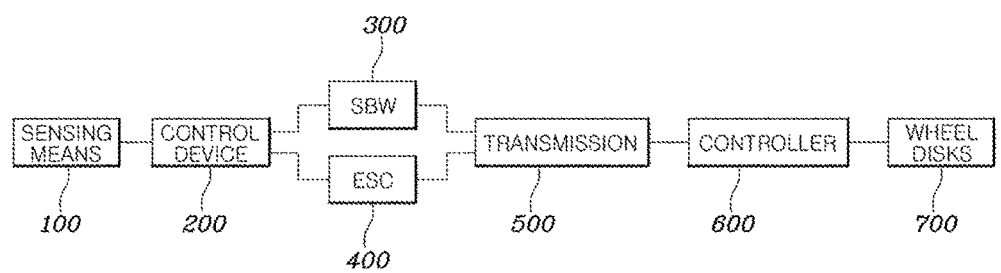
FIG. 2 is a block diagram illustrating a device for implementing the method of FIG. 1.

FIG. 2 is a block diagram illustrating a control system for implementing the method in FIG. 1. A P-range engagement device of the vehicle according to an exemplary embodiment of the present invention is a device for implementing the P-range engagement method of claim 1, and includes an electronic shift lever 300 for performing the gear shift of the transmission 500, a control device 200 configured to receive information related to the state of the vehicle, which is detected by detecting device 100 provided at a variety of locations on the vehicle, an electronic stability control (ESC) system 400 for controlling the orientation of the vehicle body based on the information received by the control device 200, and wheels configured to be held or released by a controller 600 that is controlled by the control device 200.

As is apparent from the above description, the present invention provides a P-range engagement method of the vehicle and a device thereof, in which, when the vehicle is stopped while traveling due to the circumstances on the road or by the driver's intention in the state in which the driver desires to further drive the vehicle and the vehicle stopped time period exceeds a predetermined time period, the ESC system 400 does not hold the wheel disks 700 using a hydraulic pressure but automatically shifts the shift range of the transmission to the P-range, thereby continually stopping the vehicle. Therefore, a conventional EPB can be eliminated, which leads to a simple structure and a reduction in manufacturing costs. Further, compared with an EPB, a response speed becomes faster, P-range engagement is securely achieved, and consequently, stability is improved. Furthermore, since the function of an EPB can be implemented even in the vehicle that is not equipped with an EPB, productivity is enhanced.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A P-range engagement method of a vehicle equipped with an electronic shift lever, the method comprising:
performing a vehicle stopping process based on detection of stopping of a traveling vehicle, the detection being performed by a control device;
holding wheel disks of the vehicle through a controller when the vehicle stopping process is completed, the controller being controlled by the control device;
comparing a vehicle stopped time period with a predetermined reference value stored in the control device, the vehicle stopped time period being measured by the control device, to determine whether the vehicle stopped time period exceeds the predetermined reference value; and
upon determining that the vehicle stopped time period exceeds the predetermined reference value stored in the control device, determining whether conditions for performing P-range engagement are satisfied, and upon determining that the conditions for performing the P-range engagement are satisfied, completing the P-range engagement,
wherein the comparing includes determining whether it is impossible to control a hydraulic pressure of an electronic stability control system through the control device.

2. The P-range engagement method according to claim 1, wherein the holding includes holding the wheel disks by controlling a hydraulic pressure through the controller, the controller being controlled by the control device.

3. The P-range engagement method according to claim 1, wherein, in the comparing, the reference value used in operation of smart cruise control is set to be larger than the reference value used in operation of the electronic stability control system.

4. The P-range engagement method according to claim 1, further comprising:
determining whether a P-range engagement request signal is input to the control device through the control device.

5. The P-range engagement method according to claim 4, further comprising:
upon determining that the P-range engagement request signal is input to the control device, determining whether a state of the traveling vehicle satisfies conditions for performing the P-range engagement through the control device.

6. The P-range engagement method according to claim 5, wherein, upon determining that the state of the traveling vehicle satisfies the conditions for performing the P-range engagement, the control device performs the completing the P-range engagement.

7. The P-range engagement method according to claim 5, further comprising:
upon determining that the state of the vehicle does not satisfy the conditions for performing the P-range engagement, warning a driver through the control device that the P-range engagement is incapable of being achieved even in a situation necessarily requiring the P-range engagement.

8. The P-range engagement method according to claim 4, wherein, upon determining that the P-range engagement request signal is not input to the control device, the control device performs the comparing repeatedly.

9. The P-range engagement method according to claim 1, wherein, upon determining that the vehicle stopped time period is less than the predetermined reference value stored in the control device, the control device measures the vehicle stopped time period repeatedly.

10. The P-range engagement method according to claim 1, further comprising:
after the completing the P-range engagement, releasing the holding the wheel disks through the controller, the controller being controlled by the control device.

11. A control system for implementing the P-range engagement method of the vehicle in claim 1, the control system comprising:
an electronic shift lever for performing gear shift of a transmission;
a control portion configured to receive information related to a state of the vehicle, the information being detected by a detecting device provided at a plurality of locations on the vehicle which travels;
the electronic stability control system for controlling an orientation of a vehicle body based on the information received by the control portion; and
wheels configured to be held or released by the controller, the controller being controlled by the control portion.

* * * * *